(12) United States Patent
Park

(10) Patent No.: US 9,958,155 B1
(45) Date of Patent: May 1, 2018

(54) REGENERATIVE THERMAL OXIDIZER

(71) Applicant: EMSOLUTION CO., Ltd., Gyeonggi-do (KR)

(72) Inventor: Hoon Min Park, Gyeonggi-do (KR)

(73) Assignee: EMSOLUTION CO., Ltd., Gyeonggi-do (KR)

( * ) Notice: Subject to any disclaimer, the term of this patent is extended or adjusted under 35 U.S.C. 154(b) by 0 days. days.

(21) Appl. No.: 15/458,989

(22) Filed: Mar. 15, 2017

(30) Foreign Application Priority Data

Jan. 12, 2017 (KR) ........................ 10-2017-0005049

(51) Int. Cl.
*F23G 7/06* (2006.01)
*F23G 5/46* (2006.01)

(52) U.S. Cl.
CPC ............. *F23G 5/46* (2013.01); *F23G 7/065* (2013.01); *F23G 7/068* (2013.01); *F23G 2206/00* (2013.01)

(58) Field of Classification Search
CPC ............. F23G 7/065; F23G 7/068; F23G 5/46
See application file for complete search history.

(56) References Cited

U.S. PATENT DOCUMENTS

| 5,871,347 A * | 2/1999 | Chen ................... B01D 53/864 422/173 |
| 5,967,771 A * | 10/1999 | Chen ................... B01D 53/864 110/211 |
| 6,193,504 B1 * | 2/2001 | Chen ................... B01D 53/864 432/72 |
| 6,235,249 B1 * | 5/2001 | Fu ........................ B01D 53/74 422/173 |
| 7,762,808 B2 * | 7/2010 | Lee ........................ F28D 19/04 165/8 |
| 2002/0150515 A1 * | 10/2002 | Pack ................... B01D 53/0446 422/168 |

FOREIGN PATENT DOCUMENTS

| KR | 20-0306996 | 3/2003 |
| KR | 10-1045419 | 6/2011 |

* cited by examiner

*Primary Examiner* — Nathaniel Herzfeld
(74) *Attorney, Agent, or Firm* — JCIPRNET

(57) ABSTRACT

A regenerative thermal oxidizer purifies a polluted gas by oxidizing a volatile organic compound (VOC) contained in the polluted gas at a high temperature by using an amount of heat of the polluted gas.

7 Claims, 6 Drawing Sheets

REGENERATIVE THERMAL OXIDIZER

CROSS-REFERENCE TO RELATED APPLICATION

This application claims the benefit of Korean Patent Application No. 10-2017-0005049, filed on Jan. 12, 2017, in the Korean Intellectual Property Office, the disclosure of which is incorporated herein in its entirety by reference.

BACKGROUND

1. Field

One or more example embodiments relate to a regenerative thermal oxidizer, and more particularly, to a regenerative thermal oxidizer that purifies a polluted gas by oxidizing a volatile organic compound (VOC) contained in the polluted gas at a high temperature by using a quantity of heat of the polluted gas.

2. Description of the Related Art

A regenerative thermal oxidizer (RTO) is widely used to purify a polluted gas containing a volatile organic compound (VOC).

As the polluted gas contains a VOC, the gas has itself a predetermined quantity of heat, and thus, by burning the polluted gas having a relatively high temperature, in a combustion chamber at a high temperature, the VOC is oxidized to carbon dioxide and water. By allowing the polluted gas to pass through a regenerative material which is ceramic material, the quantity of heat of the polluted gas may be sufficiently utilized, consumption of auxiliary fuel for combustion may be minimized.

In the regenerative thermal oxidizer as described above, a distributor that separates and distributes a flow of the polluted gas flowing into the chamber and a flow of gas that is discharged after being burned and purified in the chamber to be purified, has a major impact on performance of the RTO.

RTOs according to the related art include a rotary distributor that rotates a rotary member having a cylindrical drum shape and including an inlet path and a discharge path. In regard to the distributor including a drum-shaped rotary member as above, the rotary member is frequently stopped by pollutants such as dust or due to thermal expansion caused by a high temperature in case of a long period of use. In this case, purification of a polluted gas is not properly performed, and according to circumstances, the distributor is damaged or a fire breaks out or an explosion occurs. In addition, if a rotary member in a distributor of the RTOs of the related art breaks down, repair or maintenance of the rotary member is impossible or very difficult.

SUMMARY

One or more example embodiments include a regenerative thermal oxidizer (RTO) that has a high durability and is easy to maintain due to a compact and robust structure.

Additional aspects will be set forth in part in the description which follows and, in part, will be apparent from the description, or may be learned by practice of the presented embodiments.

According to one or more example embodiments, a regenerative thermal oxidizer supplies an air to be purified, into a chamber though an inlet pipe, and supplies a purge air as through a purge pipe to the chamber, and purifies the air in the chamber by using a combustion oxidization method and discharges the purified gas through an outlet pipe, wherein the regenerative thermal oxidizer includes: an upper plate that is coupled to a lower portion of the chamber and includes an upper inlet through which the air supplied to the chamber passes, an upper purge port through which a purge air supplied to the chamber passes, and an upper outlet through which an air purified in the chamber passes to be discharged, wherein the upper inlet, the upper purge port, and the upper outlet are sequentially radially disposed; a lower plate that is coupled under the upper plate and includes a lower inlet that is formed at a position corresponding to the upper inlet and connected to the inlet pipe, a lower purge port that is formed at a position corresponding to the upper purge port and is connected to the purge pipe, and a lower outlet that is formed at a position corresponding to the upper outlet and is connected to the outlet pipe; a middle plate that has a planar disk shape and is disposed between the upper plate and the lower plate, and includes a middle inlet formed at a position corresponding to the upper inlet, a middle purge port formed at a position corresponding to the upper purge port, and a middle outlet formed at a position corresponding to the upper outlet; an upper rail set including a first upper rail that is in a ring shape and formed to surround an outer circumference of the upper inlet, a second upper rail that is in a ring shape and formed to surround an outer circumference of the upper purge port, and a third upper rail that is in a ring shape and formed to surround an outer circumference of the upper outlet, wherein the upper rail set is coupled to a lower surface of the upper plate so as to tightly seal a gap between the upper plate and the middle plate; a lower rail set including a first lower rail that is in a ring shape and formed to surround an outer circumference of the middle inlet, a second lower rail that is in a ring shape and formed to surround an outer circumference of the middle purge port, and a third lower rail that is in a ring shape and formed to surround an outer circumference of the middle outlet, wherein the lower rail set is coupled to a lower surface of the middle plate so as to tightly seal a gap between the lower plate and the middle plate; an upper rail cover set including a first upper rail cover that is in a ring shape and formed such that the first upper rail is seated in the first upper rail cover, a second upper rail cover that is in a ring shape and formed such that the second upper rail is seated in the second upper rail cover, and a third upper rail cover that is in a ring shape and formed such that the third upper rail is seated in the third upper rail cover, the upper rail cover set being coupled to an upper surface of the middle plate; a lower rail cover set including a first lower rail cover that is in a ring shape and formed such that the first lower rail is seated in the first lower rail cover, a second lower rail cover that is in a ring shape and formed such that the second lower rail is seated in the second lower rail cover, and a third lower rail cover that is in a ring shape and formed such that the third lower rail is seated in the third lower rail cover, the lower rail cover set being coupled to an upper surface of the lower plate; and a rotating unit connected to the middle plate and configured to rotate the middle plate.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The present invention will now be described more fully with reference to the accompanying drawings.

Figure 1:
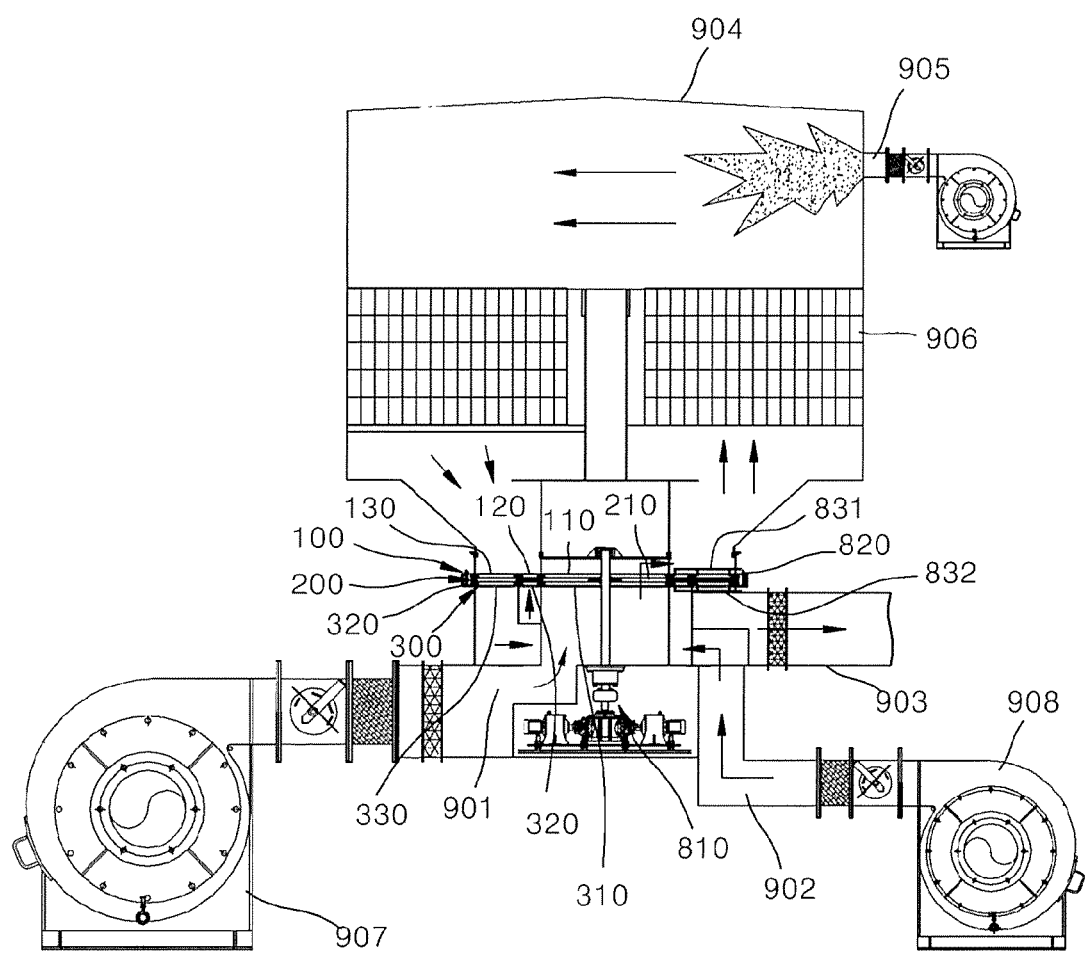
FIG. 1 is a cross-sectional view of a regenerative thermal oxidizer according to an example embodiment of the present invention.
Figure 2:
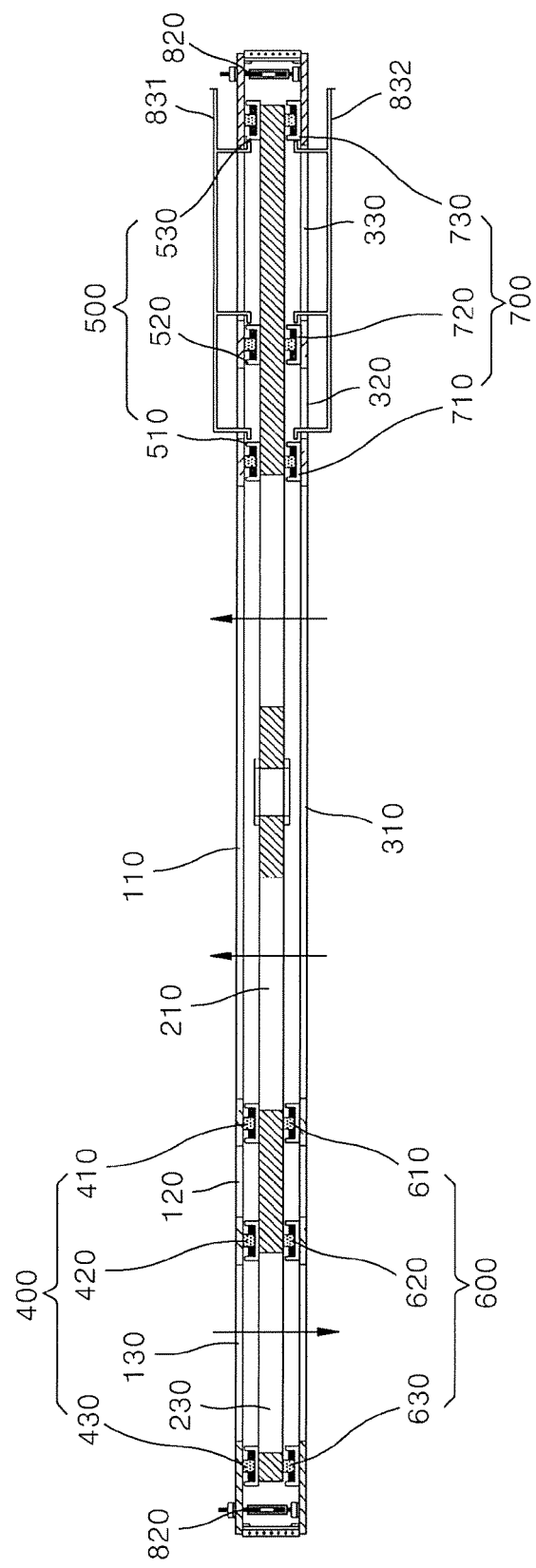
FIG. 2 is a partial cross-sectional view of the regenerative thermal oxidizer illustrated in FIG. 1.

FIG. 1 is a cross-sectional view of a regenerative thermal oxidizer according to an example embodiment of the present invention. FIG. 2 is a partial cross-sectional view of the regenerative thermal oxidizer illustrated in FIG. 1.

Referring to FIGS. 1 and 2, the regenerative thermal oxidizer according to the present embodiment includes an inlet pipe 901, a purge pipe 902, an outlet pipe 903, an upper plate 100, a middle plate 200, and a lower plate 300.

The inlet pipe 901, the purge pipe 902, and the outlet pipe 903 are each connected to a chamber 904 to supply or discharge the air.

A polluted air that needs to be purified is supplied to the chamber 904 through the inlet pipe 901 via an inlet fan 907. The polluted air that has flown in through the inlet pipe 901 is burned in the chamber 904 with oxygen to be purified and discharged to the outside through the outlet pipe 903. To separate a flow of the air flowing in through the inlet pipe 901 and a flow of the air discharged through the outlet pipe 903 from each other, a purge air is supplied through the purge pipe 902 via a purge fan 908. The purge air is supplied into the chamber 904 through the purge pipe 902 so as to prevent mixing of gases respectively flowing to the inlet pipe 901 and the outlet pipe 903.

The upper plate 100, the middle plate 200, and the lower plate 300 are mounted under the chamber 904 so as to distribute an air flowing into the chamber 904 and an air discharging from the chamber 904. That is, the upper plate 100, the middle plate 200, and the lower plate 300 are disposed on a path of the inlet pipe 901, the purge pipe 902, and the outlet pipe 903 so as to separate or adjust the flow of the air.

Referring to FIGS. 1 and 2, the upper plate 100, the middle plate 200, and the lower plate 300 are sequentially disposed under the chamber 904. The upper plate 100 is coupled to the chamber 904, and the lower plate 300 is coupled to the upper plate 100. The middle plate 200 is disposed between the upper plate 100 and the lower plate 300. The middle plate 200 is connected to a rotating unit 810 disposed below the chamber 904 as illustrated in FIG. 1. The rotating unit 810 rotates the middle plate 200. The middle plate 200 rotates between the upper plate 100 and the lower plate 300 via operation of the rotating unit 810.

Figure 5:
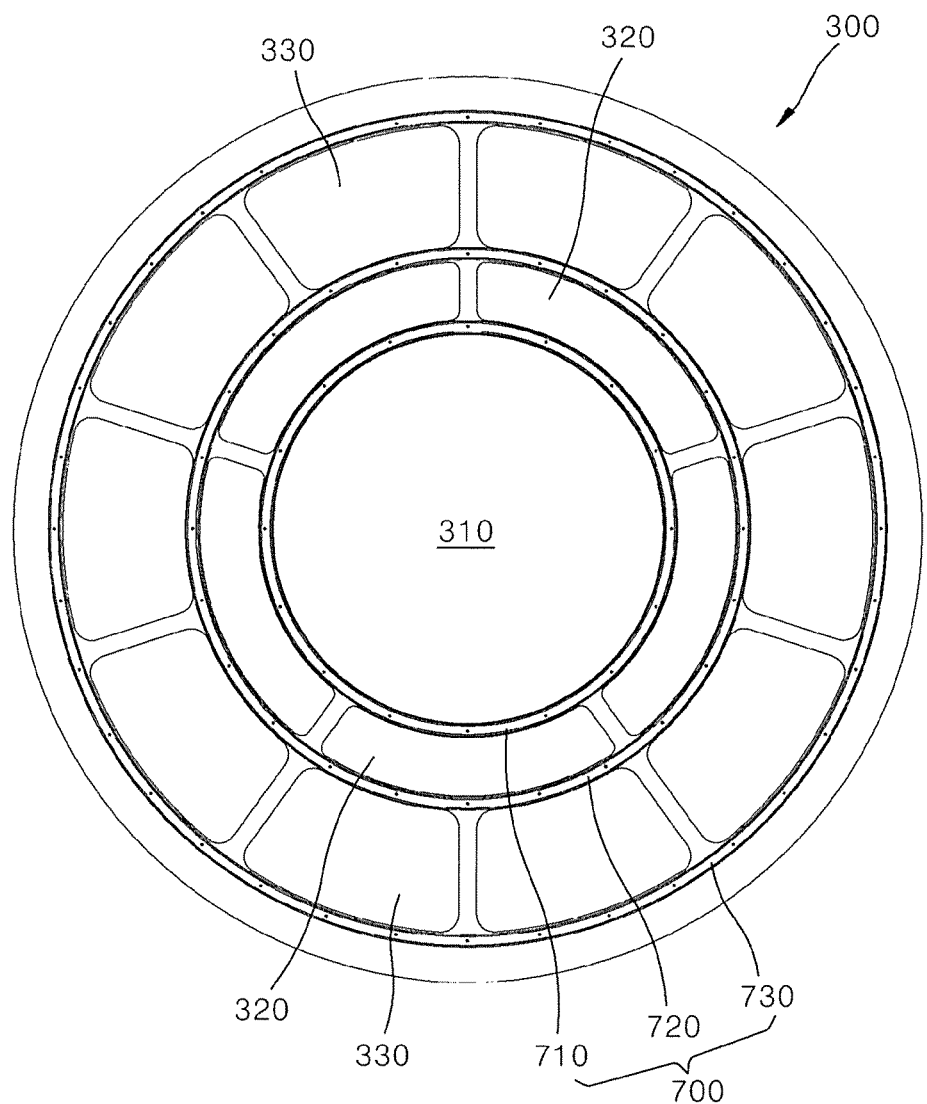
FIG. 5 is a plan view of a lower plate of the regenerative thermal oxidizer illustrated in FIG. 1.

Referring to FIG. 5, the lower plate 300 includes a lower inlet 310, a lower purge port 320, and a lower outlet 330. The lower inlet 310, the lower purge port 320, and the lower outlet 330 are sequentially radially disposed from a center of the lower plate 300. The lower inlet 310 has a circular shape in the center of the lower plate 300. The lower purge port 320 and the lower outlet 330 are each in a ring shape. As illustrated in FIG. 5, the lower purge port 320 and the lower outlet 330 each have a support frame to support the lower plate 300.

The inlet pipe 901 is connected to the lower inlet 310 of the lower plate 300 so that an air to be purified (polluted gas) is supplied through the inlet pipe 901. The purge pipe 902 is connected to the lower purge port 320 of the lower plate 300 so that a purge air is supplied therethrough. The outlet pipe 903 is connected to the lower outlet 330 of the lower plate 300 and the air purified in the chamber 904 is discharged through the outlet pipe 903.

Figure 3:
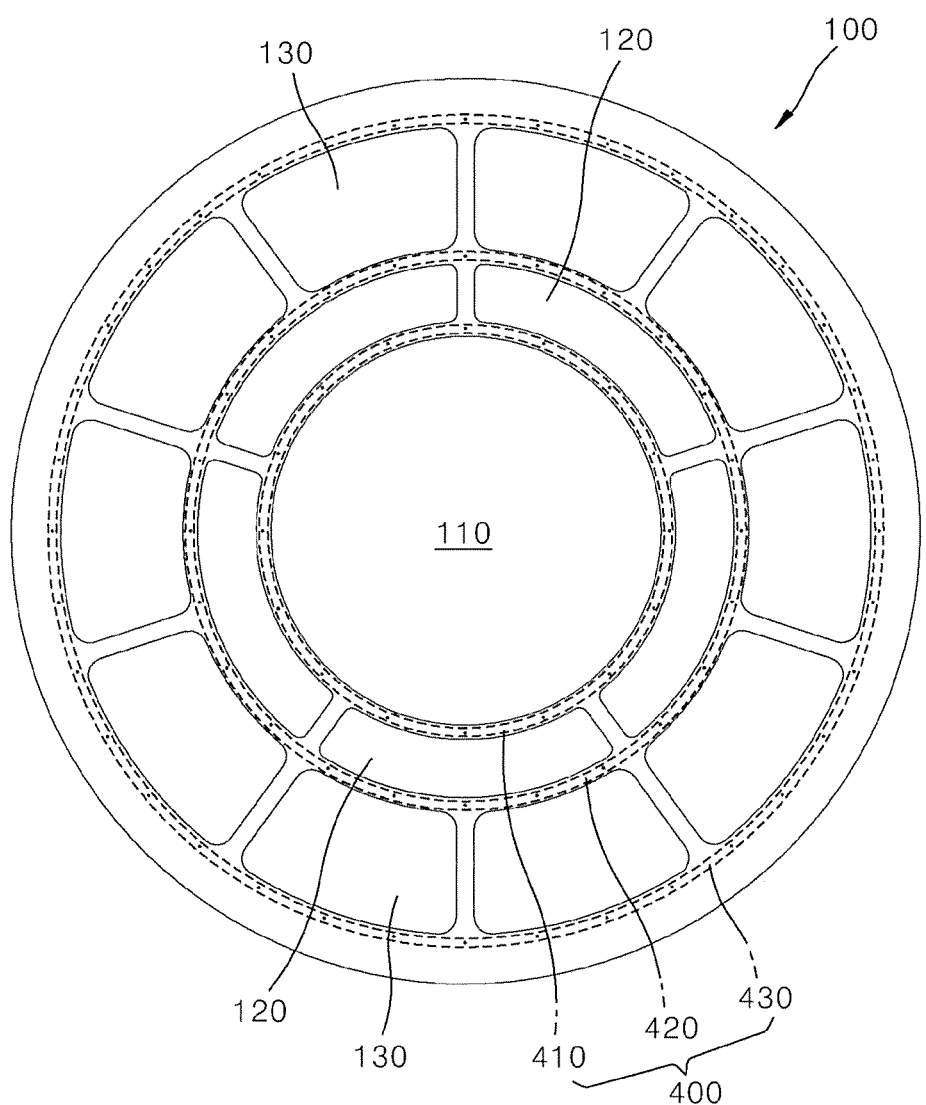
FIG. 3 is a plan view of an upper plate of the regenerative thermal oxidizer illustrated in FIG. 1.

Referring to FIG. 1, the upper plate 100 is disposed on the lower plate 300 to be coupled to a lower portion of the chamber 904. As illustrated in FIG. 3, the upper plate 100 includes an upper inlet 110, an upper purge port 120, and an upper outlet 130 that are each sequentially radially disposed from a center of the upper plate 100. Like the lower inlet 310, the lower purge port 320, and the lower outlet 330 of the lower plate 300, the upper inlet 110 of the upper plate 100 has a circular shape in a center, and the upper purge port 120 and the upper outlet 130 of the upper plate 100 each have a ring shape. The upper inlet 110 is disposed at a position corresponding to that of the lower inlet 310, and the upper purge port 120 is disposed at a position corresponding to that of the lower purge port 320, and the upper outlet 130 is disposed at a position corresponding to that of the lower outlet 330.

Figure 4:
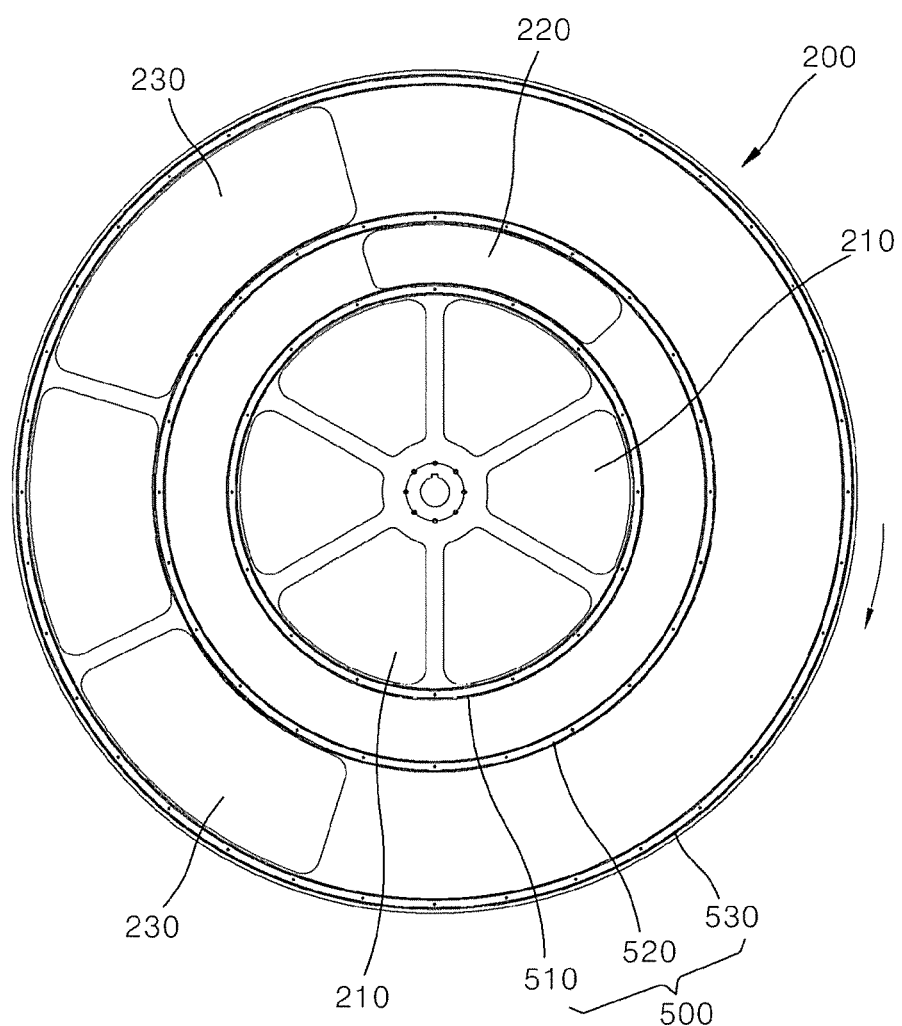
FIG. 4 is a plan view of a middle plate of the regenerative thermal oxidizer illustrated in FIG. 1.

Referring to FIGS. 1 and 2, the middle plate 200 is disposed between the upper plate 100 and the lower plate 300. The middle plate 200 is in a planar disk form. As illustrated in FIG. 4, in the middle plate 200, a middle inlet 210, a middle purge port 220, and a middle outlet 230 are sequentially radially formed from a center. Like the lower inlet 310 of the lower plate 300, the middle inlet 210 of the middle plate 200 is in a circular shape in a center portion. Referring to FIG. 4, according to the present embodiment, the middle purge port 220 and the middle outlet 230 of the middle plate 200 are each only partially in an arc shape along a circumferential direction. In addition, the middle purge port 220 is disposed in the front of the middle outlet 230 with respect to a rotational direction of the middle plate 200. According to the present embodiment, the middle plate 200 rotates in a clockwise direction with respect to FIG. 4. Accordingly, the middle purge port 220 of the middle plate 200 is disposed in front of the middle outlet 230 with respect to a clockwise direction. The middle inlet 210 is formed at a position corresponding to the lower inlet 310, and the middle purge port 220 is formed at a position corresponding to the lower purge port 320, and the middle outlet 230 is formed at a position corresponding to the lower outlet 330.

Referring to FIGS. 2 and 5, an upper rail set 400 and an upper rail cover set 500 are mounted between the upper plate 100 and the middle plate 200.

The upper rail set 400 is coupled to a lower surface of the upper plate 100, and the upper rail cover set 500 is coupled to an upper surface of the middle plate 200.

The upper rail set 400 includes a first upper rail 410, a second upper rail 420, and a third upper rail 430. The first upper rail 410, the second upper rail 420, and the third upper rail 430 are each in a ring shape. The first upper rail 410 is formed to surround an outer circumference of the upper inlet 110, and the second upper rail 420 is formed to surround an outer circumference of the upper purge port 120, and the third upper rail 430 is formed to surround an outer circumference of the upper outlet 130.

The upper rail cover set 500 includes a first upper rail cover 510, a second upper rail cover 520, and a third upper rail cover 530. The first upper rail cover 510, the second upper rail cover 520, and the third upper rail cover 530 are each in a ring shape. The first upper rail cover 510 is formed such that the first upper rail 410 is seated therein, the second upper rail cover 520 is formed such that the second upper rail 420 is seated therein, and the third upper rail cover 530 is formed such that the third upper rail 430 is seated therein. That is, the first upper rail cover 510, the second upper rail cover 520, and the third upper rail cover 530 each have a concave cross-section so that the first upper rail 410, the second upper rail 420, and the third upper rail 430 are seated in the concave grooves of the first upper rail cover 510, the second upper rail cover 520, and the third upper rail cover 530, respectively.

A lubricant is coated between the upper rail set 400 and the upper rail cover set 500. An interaction between the upper rail set 400 and the upper rail cover set 500 allows the middle plate 200 to easily rotate with respect to the upper plate 100. In addition, the flow of the air between the upper plate 100 and the middle plate 200 is tightly sealed by the structure of the upper rail set 400 and the upper rail cover set 500 and the lubricant. The air flowing to the middle inlet 210 and the upper inlet 110 is tightly sealed by the first upper rail 410 and the first upper rail cover 510. The air flowing to the middle purge port 220 and the upper purge port 120 is tightly sealed by the first upper rail 410 and the first upper rail cover 510 and the second upper rail 420 and the second upper rail cover 520. The air flowing to the middle outlet 230 and the upper outlet 130 is tightly sealed by the second upper rail 420 and the second upper rail cover 520 and the third upper rail 430 and the third upper rail cover 530.

Figure 6:
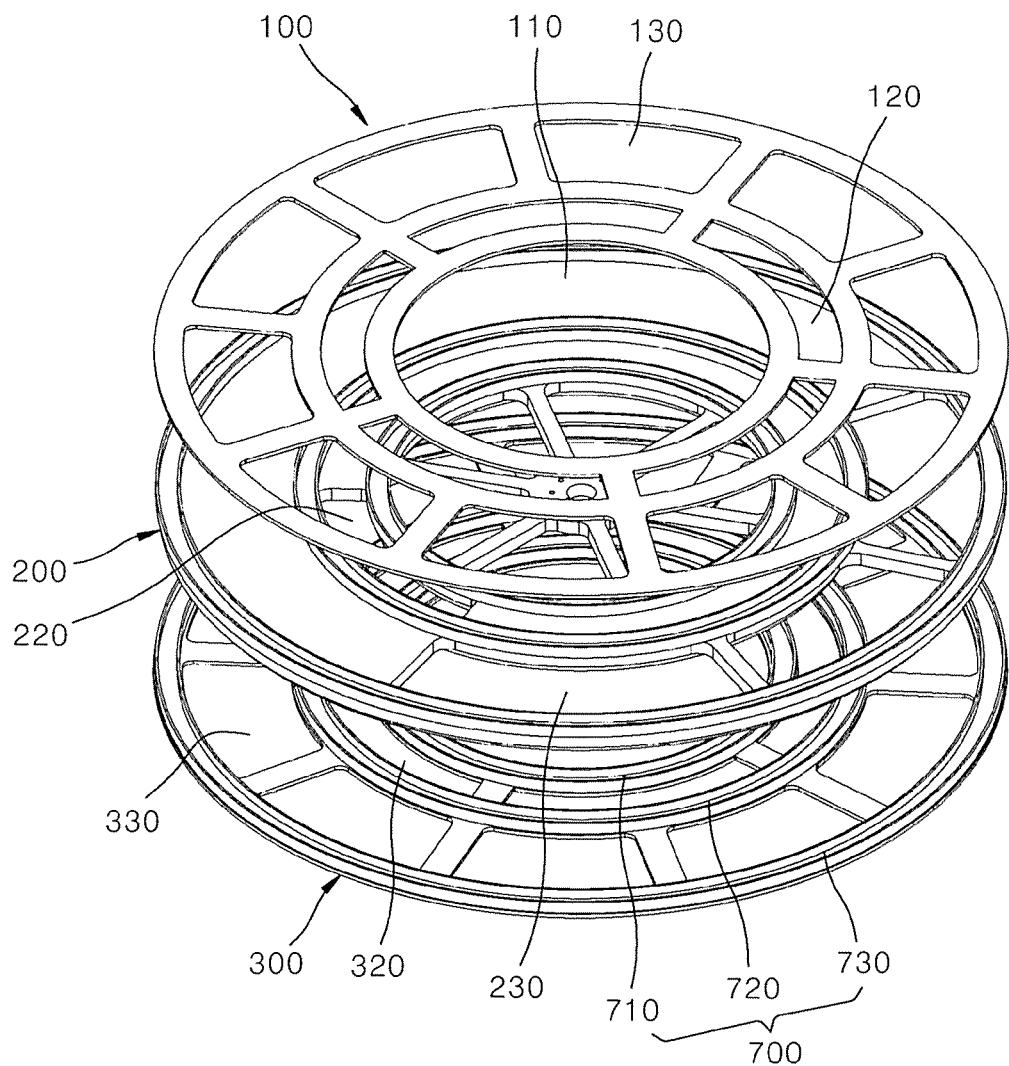
FIG. 6 is a disassembled perspective view of a portion of the regenerative thermal oxidizer of FIG. 1.

Referring to FIGS. 2 and 6, a lower rail set 600 and a lower rail cover set 700 are mounted between the middle plate 200 and the lower plate 300.

The lower rail set 600 is coupled to a lower surface of the middle plate 200, and the lower rail cover set 700 is coupled to an upper surface of the lower plate 300.

The lower rail set 600 includes a first lower rail 610, a second lower rail 620, and a third lower rail 630. The first lower rail 610, the second lower rail 620, and the third lower rail 630 are each in a ring shape. The first lower rail 610 is formed to surround an outer circumference of the lower inlet 310, and the second lower rail 620 is formed to surround an outer circumference of the lower purge port 320, and the third lower rail 630 is formed to surround an outer circumference of the lower outlet 330.

The lower rail cover set 700 includes a first lower rail cover 710, a second lower rail cover 720, and a third lower rail cover 730. The first lower rail cover 710, the second lower rail cover 720, and the third lower rail cover 730 are each in a ring shape. The first lower rail cover 710 is formed such that the first lower rail 610 is seated therein, the second lower rail cover 720 is formed such that the second lower rail 620 is seated therein, and the third lower rail cover 730 is formed such that the third lower rail 630 is seated therein. That is, the first lower rail cover 710, the second lower rail cover 720, and the third lower rail cover 730 each have a concave cross-section so that the first lower rail 610, the second lower rail 620, and the third lower rail 630 are seated in the concave grooves of the first lower rail cover 710, the second lower rail 620, and the third lower rail 630, respectively.

A lubricant is coated between the lower rail set 600 and the lower rail cover set 700. An interaction between the lower rail set 600 and the lower rail cover set 700 allows the middle plate 200 to easily rotate with respect to the lower plate 300. In addition, the flow of the air between the lower plate 300 and the middle plate 200 is tightly sealed by the structure of the lower rail set 600 and the lower rail cover set 700 and the lubricant. The air flowing to the lower inlet 310 and the middle inlet 210 is tightly sealed by the first lower rail 610 and the first lower rail cover 710. The air flowing to the lower purge port 320 and the middle purge port 220 is tightly sealed by the first lower rail 610 and the first lower rail cover 710 and the second lower rail 620 and the second lower rail cover 720. The air flowing to the middle outlet 230 and the lower outlet 330 is tightly sealed by the second lower rail 620 and the second lower rail cover 720 and the third lower rail 630 and the third lower rail cover 730.

A plurality of distance adjustors 820 are mounted between the upper plate 100 and the lower plate 300. The plurality of distance adjustors 820 are arranged at predetermined distances along a circumferential direction of the upper plate 100 and the lower plate 300 to be coupled to the upper plate 100 and the lower plate 300. According to the present embodiment, turn buckles are used as the distance adjustors 820. One end of the distance adjustor 820 is coupled to the upper plate 100, and the other end of the distance adjustor 820 is coupled to the lower plate 300, thereby adjusting a distance between the upper plate 100 and the lower plate 300.

Referring to FIGS. 1 and 2, the regenerative thermal oxidizer according to the present embodiment includes an upper lubrication pipe 831 and a lower lubrication pipe 832. The upper lubrication pipe 831 is disposed to supply a lubricant between the upper rail set 400 and the upper rail cover set 500, and the lower lubrication pipe 832 is disposed to supply a lubricant between the lower rail set 600 and the lower rail cover set 700.

The upper lubrication pipe 831 is formed to extend to positions adjacent to the first upper rail 410 and the first upper rail cover 510, the second upper rail 420 and the second upper rail cover 520, and the third upper rail 430 and the third upper rail cover 530.

The lower lubrication pipe 832 is formed to extend to positions adjacent to the first lower rail 610 and the first lower rail cover 710, the second lower rail 620 and the second lower rail cover 720, and the third lower rail 630 and the third lower rail cover 730.

Hereinafter, an operation of the regenerative thermal oxidizer according to the present embodiment configured as described above will be described.

A polluted gas that is to be purified flows into the lower inlet 310 of the lower plate 300 through the inlet pipe 901. The polluted gas that has flown into the lower inlet 310 flows into the chamber 904 through the middle inlet 210 of the middle plate 200 and the upper inlet 110 of the upper plate 100.

A discharge gas that has flown into the chamber 904 passes a regenerative material 906, which is ceramic material, so as to be burned by a burner 905 disposed at an upper portion of the chamber 904 and purified. Harmful components contained in the polluted gas are removed by being purified by high-temperature combustion. When combustion is completed, the purified gas passes the regenerative material 906 again to transfer heat of the gas to the regenerative material 906, and then is discharged to the outside. The gas that has passed the regenerative material 906 sequentially passes the upper outlet 130, the middle outlet 230, and the lower outlet 330 to be discharged through the outlet pipe 903.

In addition, a purge air is also supplied into the chamber 904 so as to supply oxygen for easy combustion of the polluted gas in the chamber 904 and dust off pollutants such as dusts accumulated in the regenerative material 906. The purge air sequentially passes through the lower purge port 320, the middle purge port 220, and the upper purge port 120 through the purge pipe 902 and flows into the chamber 904. The purge air prevents mixing of the air flowing through the inlet pipe 901 and the air discharged through the outlet pipe 903 in a region around the middle plate 200.

The purge air passes the regenerative material 906 along with the polluted gas so as to be supplied into an upper portion of the chamber 904. The purge air dusts off pollutants created when the polluted gas is burned by the burner, in the regenerative material 906.

The middle plate 200 disposed between the upper plate 100 and the lower plate 300 continuously rotates via the rotating unit 810. The lower inlet 310, the middle inlet 210, and the upper inlet 110 are disposed in a center and fluidly connected at identical positions in a vertical direction, and thus, the polluted gas that has flown in through the inlet pipe 901 may flow into the chamber 904 continuously, without being affected by rotational movement of the middle plate 200.

Unlike the middle inlet 210, the middle purge port 220 and the middle outlet 230 are partially formed in an arc shape only in a partial section along a circumferential direction of the middle plate 200 as illustrated in FIG. 4, and thus, a purge air may be supplied to different positions of the chamber 904 according to rotation of the middle plate 200, and a discharged gas also is discharged at different positions of the chamber 904. As described above, in the regenerative thermal oxidizer of the present embodiment, the middle purge port 220 is disposed in front of the middle outlet 230 with respect to a rotational direction of the middle plate 200. That is, the middle purge port 220 is disposed in front of the middle outlet 230 in a clockwise direction with respect to the middle plate 200 rotating clockwise with respect to FIG. 4. Accordingly, the purge air flows into the chamber 904 in the clockwise direction and is mixed with the polluted gas that has flown in through the inlet pipe 901 to be burned, and then passes the middle outlet 230 that is disposed after the middle outlet 220 so as to be discharged to the outside through the outlet pipe 903.

As the middle purge port 220 is disposed only in a partial section of the middle plate 200 as described above, the polluted gas flowing into the chamber 904 according to rotation of the middle plate 200 is effectively mixed with the purge air. Pollutants are uniformly oxidized in the chamber 904 by the purge air. As a result, a combustion efficiency of the polluted gas in the chamber 904 is improved. In addition, the purge air which flows at a relatively high intensity through the purge port 220 which is relatively narrow, dusts off pollutants such as dusts accumulated in the chamber 904 and the regenerative material 906. The pollutants that are dusted off by the purge air are effectively discharged through the middle outlet 230 that follows the middle purge port 220 in the clockwise direction.

The middle outlet 230 is formed only in a partial section along a circumferential direction of the middle plate 200 as described above, and the middle plate 200 rotates via the rotating unit 810, and thus, the polluted gas burned in the chamber 904 sequentially passes the regenerative material 906 in a circumferential direction and is discharged to the outside through the outlet pipe 903.

An upper portion of the middle plate 200 is supported by the upper plate 100 and is easily rotated due to the upper rail set 400 mounted on the upper plate 100 and the upper rail cover set 500 mounted on the middle plate 200.

In addition, a lower portion of the middle plate 200 is supported by the lower plate 300 and is easily rotated due to the lower rail set 600 mounted on the middle plate 200 and the lower rail cover set 700 mounted on the lower plate 300.

The first upper rail 410, the first upper rail cover 510, the first lower rail 610, and the first lower rail cover 710 tightly seal effectively such that the polluted gas flowing from the inlet pipe 901 to the chamber 904 does not leak and blocks and prevents a purge air from flowing into an inlet path of the polluted gas.

The second upper rail 420, the second upper rail cover 520, the second lower rail 620, and the second lower rail cover 720 tightly seal effectively such that a purge air flowing from the purge pipe 902 to the chamber 904 does not leak and blocks and prevents a discharge gas from flowing into an inlet path of the purge air.

The third upper rail 430, the third upper rail cover 530, the third lower rail 630, and the third lower rail cover 730 tightly seal effectively such that a discharge gas flowing from the chamber 904 to the outlet pipe 903 does not leak.

As described above, the distributor consisting of the upper plate 100, the middle plate 200, and the lower plate 300 has a compact and robust structure as the distributor includes the middle plate 200 having a planar disk structure. Thus, even when the distributor is used for a long period of time, the possibility of breakdown or damage is reduced to a very low level. In addition, as the upper and lower surfaces of the middle plate 200 are supported by the upper rail set 400, the upper rail cover set 500, the lower rail set 600, and the lower rail cover set 700, the middle plate 200 may rotate easily. Accordingly, rotation of the middle plate 200 is hardly stopped by various factors such as foreign substances. Thus, an operation of distributing an inflow gas and a discharge gas may be stably performed via rotation of the middle plate 200.

In addition, the middle plate 200 and other peripheral components around the middle plate 200 may be easily separated by separating the lower plate 300 from the upper plate 100 coupled to the lower portion of the chamber 904. Thus, the regenerative thermal oxidizer according to the present embodiment is easy to maintain and repair.

In addition, by using the configurations of the upper rail set 400, the upper rail cover set 500, the lower rail set 600, and the lower rail cover set 700, the middle plate 200 may easily rotate between the upper plate 100 and the lower plate 300, and spaces between paths of the airs respectively flowing to the inlet pipe 901, the purge pipe 902, and the outlet pipe 903 may be effectively separated and blocked at the same time.

If the upper rail set 400, the upper rail cover set 500, the lower rail set 600, and the lower rail cover set 700 or the like are worn out due to long periods of time, a distance between the upper plate 100 and the lower plate 300 may be adjusted by using the distance adjustors 820 which are formed of turn buckles. According to this configuration, performance of the regenerative thermal oxidizer according to the present embodiment may be easily maintained.

As illustrated in FIGS. 1 and 2, when a lubricant is supplied through the upper lubrication pipe 831 and the lower lubrication pipe 832, a gap between the upper rail set 400 and the upper rail cover set 500 and a gap between the lower rail set 600 and the lower rail cover set 700 may be tightly sealed and the middle plate 200 may also be easily smoothly rotated. According to the configurations of the upper lubrication pipe 831 and the lower lubrication pipe 832 as described above, performance of the regenerative thermal oxidizer according to the present embodiment may be maintained for a long period of time and easily repaired without disassembling components of the regenerative thermal oxidizer such as the lower plate 300 and the middle plate 200 or the like.

While the present invention has been described with reference to preferred embodiments above, the scope of the present invention is not limited to the embodiments described above and illustrated in the drawings.

For example, the structures of the upper lubrication pipe 831 and the lower lubrication pipe 832 are not limited to those illustrated in FIG. 2 but may be modified to other various configurations. In addition, a regenerative thermal oxidizer without the upper lubrication pipe 831 and the lower lubrication pipe 832 may also be configured. In this case, a lower plate and a middle plate may be regularly separated to refill a lubricant and then the lower plate and the middle plate may be reassembled.

In addition, while the upper rail set 400 is described as being mounted on a the upper plate 100 and the upper rail cover set 500 is mounted on the middle plate 200, a regenerative thermal oxidizer in which an upper rail set is on a middle plate, and an upper rail cover set is mounted on an upper plate may also be configured. A lower rail set and a lower rail cover set may also be mounted at different positions according to necessity.

In addition, a regenerative thermal oxidizer without the upper rail cover set 500 and the lower rail cover set 700 may also be configured. In this case, recesses in which an upper rail cover set and a lower rail cover set may be seated may be respectively formed in a middle plate and a lower plate so as to guide rotation of the upper rail cover set and the lower rail cover set. Meanwhile, mounting positions of the upper rail cover set and the lower rail cover set may also be not limited to the upper plate and the middle plate, respectively. Alternatively, a regenerative thermal oxidizer in which an upper rail cover set and a lower rail cover set are respectively mounted on a middle plate and a lower plate may also be configured.

In addition, while turnbuckles are described as the distance adjustors 820, other components may also be used as distance adjustors. For example, a distance adjustor including a bolt and a nut may be used. By tightening or loosening screw coupling between a bolt and a nut, a distance between a lower plate and an upper plate may be adjusted.

In addition, while the middle purge port 220 is described as being disposed in front of the middle outlet 230 with respect to a rotational direction of the middle plate 200, positions of a middle purge port and a middle outlet may be modified in various manners according to necessity. The middle purge port 220 and the middle outlet 230 are described as being formed in a partial section of the middle plate 200 according to a circumferential direction, but the middle outlet may also have a ring shape according to circumstances.

The regenerative thermal oxidizer according to the present invention has a structure that is highly durable and easy to maintain.

According to the regenerative thermal oxidizer of the present invention, a polluted gas flowing into a chamber and a purified discharge gas may be effectively separated from each other and stably distributed.

According to the regenerative thermal oxidizer of the present invention, the danger of fire and explosion may be reduced and stability of the regenerative thermal oxidizer may be improved by smoothly distributing an inflow of a polluted gas and a discharge of a purified gas.

While one or more example embodiments have been described with reference to the figures, it will be understood by those of ordinary skill in the art that various changes in form and details may be made therein without departing from the spirit and scope of the inventive concept as defined by the following claims.

What is claimed is:

1. A regenerative thermal oxidizer that supplies an air to be purified, into a chamber though an inlet pipe, and supplies a purge air as through a purge pipe to the chamber, and purifies the air in the chamber by using a combustion oxidization method and discharges the purified gas through an outlet pipe, the regenerative thermal oxidizer comprising:

an upper plate that is coupled to a lower portion of the chamber and comprises an upper inlet through which the air supplied to the chamber passes, an upper purge port through which a purge air supplied to the chamber passes, and an upper outlet through which an air purified in the chamber passes to be discharged, wherein the upper inlet, the upper purge port, and the upper outlet are sequentially radially disposed;

a lower plate that is coupled under the upper plate and comprises a lower inlet that is formed at a position corresponding to the upper inlet and connected to the inlet pipe, a lower purge port that is formed at a position corresponding to the upper purge port and is connected to the purge pipe, and a lower outlet that is formed at a position corresponding to the upper outlet and is connected to the outlet pipe;

a middle plate that has a planar disk shape and is disposed between the upper plate and the lower plate, and comprises a middle inlet formed at a position corresponding to the upper inlet, a middle purge port formed at a position corresponding to the upper purge port, and a middle outlet formed at a position corresponding to the upper outlet;

an upper rail set comprising a first upper rail that is in a ring shape and formed to surround an outer circumference of the upper inlet, a second upper rail that is in a ring shape and formed to surround an outer circumference of the upper purge port, and a third upper rail that is in a ring shape and formed to surround an outer circumference of the upper outlet, wherein the upper rail set is coupled to a lower surface of the upper plate so as to tightly seal a gap between the upper plate and the middle plate;

a lower rail set comprising a first lower rail that is in a ring shape and formed to surround an outer circumference of the middle inlet, a second lower rail that is in a ring shape and formed to surround an outer circumference of the middle purge port, and a third lower rail that is in a ring shape and formed to surround an outer circumference of the middle outlet, wherein the lower rail set is coupled to a lower surface of the middle plate so as to tightly seal a gap between the lower plate and the middle plate;

an upper rail cover set comprising a first upper rail cover that is in a ring shape and formed such that the first upper rail is seated in the first upper rail cover, a second upper rail cover that is in a ring shape and formed such that the second upper rail is seated in the second upper rail cover, and a third upper rail cover that is in a ring shape and formed such that the third upper rail is seated in the third upper rail cover, the upper rail cover set being coupled to an upper surface of the middle plate;

a lower rail cover set comprising a first lower rail cover that is in a ring shape and formed such that the first lower rail is seated in the first lower rail cover, a second lower rail cover that is in a ring shape and formed such that the second lower rail is seated in the second lower rail cover, and a third lower rail cover that is in a ring shape and formed such that the third lower rail is seated in the third lower rail cover, the lower rail cover set being coupled to an upper surface of the lower plate; and a rotating unit connected to the middle plate and configured to rotate the middle plate.

2. The regenerative thermal oxidizer of claim 1, further comprising a plurality of distance adjustors that are mounted between the upper plate and the lower plate so as to adjust a distance between the upper plate and the lower plate.

3. The regenerative thermal oxidizer of claim 2, wherein the plurality of distance adjustors are formed of turnbuckles.

4. The regenerative thermal oxidizer of claim 1, further comprising:
   an upper lubrication pipe extending to a position adjacent to the upper rail cover set so as to supply a lubricant between the upper rail set and the upper rail cover set; and
   a lower lubrication pipe extending to a position adjacent to the lower rail cover set so as to supply a lubricant between the lower rail set and the lower rail cover set.

5. The regenerative thermal oxidizer of claim 2, further comprising:
   an upper lubrication pipe extending to a position adjacent to the upper rail cover set so as to supply a lubricant between the upper rail set and the upper rail cover set; and
   a lower lubrication pipe extending to a position adjacent to the lower rail cover set so as to supply a lubricant between the lower rail set and the lower rail cover set.

6. The regenerative thermal oxidizer of claim 3, further comprising:
   an upper lubricant pipe extending to a position adjacent to the upper rail cover set so as to supply a lubricant between the upper rail set and the upper rail cover set; and
   a lower lubricant pipe extending to a position adjacent to the lower rail cover set so as to supply a lubricant between the lower rail set and the lower rail cover set.

7. The regenerative thermal oxidizer of claim 1, wherein the middle purge port and the middle outlet of the middle plate are formed only in a partial section along respective circumferential directions, wherein the middle purge port is disposed in front of the middle outlet with respect to a rotational direction of the middle plate.

* * * * *